United States Patent [19]

Rohleder et al.

[11] Patent Number: 5,283,017
[45] Date of Patent: Feb. 1, 1994

[54] DEVICE AND PROCESS FOR PRODUCING A MULTI-LAYER FILM COMPOSITE

[75] Inventors: Sabine Rohleder, Weiterstadt; Jochen Coutandin, Langenlonsheim; Erna Kastl, Huenstetten, all of Fed. Rep. of Germany

[73] Assignee: Hoechst Aktiengesellschaft, Frankfurt am Main, Fed. Rep. of Germany

[21] Appl. No.: 971,549

[22] Filed: Nov. 5, 1992

[30] Foreign Application Priority Data

Nov. 7, 1991 [DE] Fed. Rep. of Germany ....... 4136679

[51] Int. Cl.⁵ ............................................. B29C 65/02
[52] U.S. Cl. ...................................... 264/25; 156/324; 156/379.9; 156/543; 156/555; 264/171; 264/280; 264/284; 264/210.2; 264/342 R; 425/371
[58] Field of Search ............... 264/171, 280, 175, 284, 264/342 R, 25, 210.2; 425/371, 374; 156/244.11, 324, 555, 497, 379.9, 543

[56] References Cited

U.S. PATENT DOCUMENTS

| | | | |
|---|---|---|---|
| 27,992 | 4/1974 | Lemelson | 156/384 |
| 3,196,195 | 7/1965 | Tritsch | 264/171 |
| 4,557,778 | 12/1985 | Held | 264/284 |
| 4,778,557 | 10/1988 | Schirmer | 156/555 |
| 4,844,766 | 7/1989 | Held | 156/324 |
| 4,902,373 | 2/1990 | Regipa | 156/497 |
| 4,917,753 | 4/1990 | Torgerson et al. | 156/555 |
| 5,024,714 | 6/1991 | Lemelson | 156/500 |
| 5,061,534 | 10/1991 | Blemberg et al. | 428/36.7 |
| 5,149,394 | 9/1992 | Held | 425/371 |

FOREIGN PATENT DOCUMENTS

| | | |
|---|---|---|
| 527905 | 11/1979 | Australia . |
| 0207047 | 12/1986 | European Pat. Off. . |
| 212232 | 3/1987 | European Pat. Off. . |
| 363794 | 4/1990 | European Pat. Off. . |
| 485896 | 5/1992 | European Pat. Off. . |
| 495646 | 7/1992 | European Pat. Off. . |
| 2503757 | 8/1976 | Fed. Rep. of Germany ...... 156/324 |
| 3004321 | 6/1981 | Fed. Rep. of Germany ...... 264/175 |
| 3020008 | 12/1981 | Fed. Rep. of Germany . |
| 3530309 | 2/1987 | Fed. Rep. of Germany . |
| 1441508 | 5/1966 | France . |
| 2167876 | 8/1973 | France . |
| 46-20349 | 6/1971 | Japan ................................. 264/175 |
| 59-45123 | 3/1984 | Japan ................................. 264/171 |
| 1220080 | 1/1971 | United Kingdom . |
| 2127344 | 4/1984 | United Kingdom . |

*Primary Examiner*—Jeffery Thurlow
*Attorney, Agent, or Firm*—Foley & Lardner

[57] ABSTRACT

A device and method of producing a multi-layer film composite is provided. In accordance with the device and method, a temperature-controllable or heatable roll serves as a sealing tool, on the circumferential surface of which a number of plastic film webs are sealed together under the application of pressure and heat. The plastic film webs come into contact with the circumferential surface of the roll at equal or varying distances from each other and are guided over pressure rolls. These pressure rolls are in contact with the circumferential surface of the heatable roll under pressure. The plastic film webs pass through the gaps between the pressure rolls and the heatable roll. The plastic film webs are alternately sealing layer-free or provided on one or both sides with sealing layers, which are fused by the action of heat, so that sealing of the laminated plastic film webs on the circumferential surface of the heatable roll occurs.

31 Claims, 3 Drawing Sheets

DEVICE AND PROCESS FOR PRODUCING A MULTI-LAYER FILM COMPOSITE

BACKGROUND OF THE INVENTION

1. Field of the Invention

This invention relates to a device for producing a multi-layer film composite from plastic films having a number of supply rolls, onto which the plastic films in web form are wound. This invention also relates to a process for producing a multi-layer film composite from films including biaxially stretched thermoplastic, monoaxially stretched thermoplastic and unstretched thermoplastic, coextruded films. The films are laminated to each other with the application of pressure and heat.

2. Background

Various industries, for example apparatus engineering, automotive and aeronautical engineering or safety technology, are taking an increasingly intense interest in high-strength film composites and composite bodies. Such composites typically are in the form of webs as well as of semi-finished products, such as sheet, and as finished components. Following this development, techniques for producing mechanically relatively high-strength products are being developed by sheet manufacturers. Simultaneously with the modification of the polymeric materials provided for sheet production by the incorporation of reinforcing materials such as textile, glass or carbon fibers, techniques are being developed for manufacturing inherently strengthened sheets by orientation mechanisms.

These techniques include roll-press stretching, or the process disclosed in EP-A 0,207,047, which consists of pressing a plurality of biaxially stretched films treated with thin coextruded sealing layers under the application of pressure and heat to form a homogeneous sheet of any desired thickness. To this end, the stack of films inserted between two press plates typically is introduced into a batch-operation such as hydraulic platen presses of single or multi-platen design. The pressing operation is governed by process parameters such as pressure, temperature and time. Time, in particular stands in the way of economical production of composite laminates, especially in the case of through-heating very thick sheets. Continuously operating presses, especially double-belt presses, represent a practical, time-saving solution in this regard, but can only be used to a limited extent due to their speed of operation.

German Patent 35 30 309 discloses a process and a device for the continuous production of thermoplastic webs, especially for further processing to sheets or films, from at least one extruded thermoplastic web. The web typically is heated to processing temperature, and is cooled under pressure while in the heated state between two stationary plates so that the surface of the thermoplastic web is sized and smoothed. The cooling of the thermoplastic web takes place under the effect of surface pressure, and the web is guided, during cooling, between two continuously moving, endlessly circulating press belts.

A uniform surface pressure is exerted from the plates hydraulically or mechanically onto the inner side of the moving press belts and transmitted from these to the thermoplastic web. The plates typically are held at a lower temperature than the final temperature of the thermoplastic web in order to maintain a temperature gradient between the thermoplastic web, the press belt and the plate. Cooling of the thermoplastic web generally takes place by heat dissipation from the web via the press belt to the plates by thermal conduction. During normal operation, the surface pressure acts throughout the cooling of the thermoplastic web between the press belts.

SUMMARY OF THE INVENTION

An object of the present invention is to provide a device permitting a high speed, continuous, and cost-effective production of a film composite of predetermined thickness. Another object of the invention is to provide a film composite web formed from nonsealable and hot-sealable plastic films having improved mechanical properties when compared to extruded films of the same thickness and at least the same optical characteristics.

Another object of the invention is to provide a process for producing a multi-layer film composite in a continuous, cost-effective manner where the composite has improved mechanical properties.

These and other objects readily apparent to those skilled in the art can be achieved by a device comprising a heatable roll which serves as a sealing tool, on the circumferential surface of which sealing layer-free plastic film webs and plastic film webs provided with sealing layers are sealed together. The device further comprises heatable pressure rolls which contact the heatable roll along its circumferential surface at equal or different distances from each other, where the plastic film webs are guided over the pressure rolls and pass through the gaps between the pressure rolls and the heatable roll. In accordance with the present invention, the plastic film webs contacting the circumferential surface of the roll at distances from each other can be sealed together by the application of pressure and/or heat to the plastic film webs, which then are transported in the manner of a laminate, by the pressure rolls. The device of the invention further comprises at least one chilling, embossing and/or pressing device downstream of the heatable roll.

The invention further encompasses a process for producing a multi-layer film composite from a plurality of films including one or more biaxially stretched thermoplastic, monoaxially stretched thermoplastic and unstretched thermoplastic, coextruded films. These films are laminated to each other by the application of pressure and heat. The process of the present invention is distinguished by the fact that the film composite is built up to a predetermined final thickness by the continual, additive sealing of individually movable plastic film webs, which are alternately sealable and nonsealable, onto a movable first plastic film web. Plastic film webs provided with two sealing layers and sealing layer-free plastic film webs are fed separately and at a distance from each other to a heatable, curved surface and guided along this surface. Pressure then is exerted on each of the plastic film webs directly at its point of contact with the heatable curved surface to seal the webs together and form the multi-layer film composite.

BRIEF DESCRIPTION OF THE DRAWINGS

FIG. 6b illustrates a slightly modified embossing station compared with the embodiment illustrated in FIG. 6a.

DETAILED DESCRIPTION OF THE PREFERRED EMBODIMENTS

Figure 1:
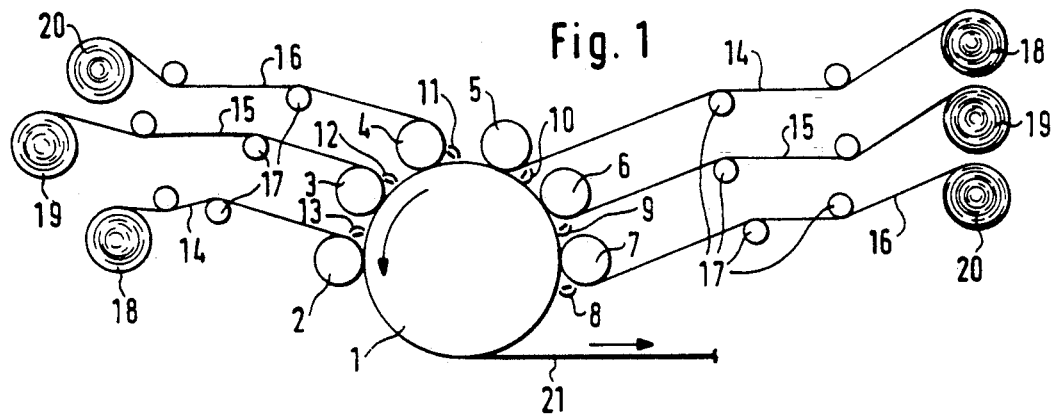
FIG. 1 illustrates a schematic elevation of an embodiment of the device according to the invention.

The present invention will be described in detail with reference to specifically preferred embodiment thereof. In the drawings, like numerals represent like elements or parts of the embodiments.

The thickness of a film composite formed by continual, additive laminating of individual plastic film webs is achieved by briefly fusing the hot sealing layers of the plastic film webs directly before the webs are brought together and pressing them to a sealing layer-free plastic film web with linear pressure. Compared with the time-consuming conventional pressing of a compact film stack in platen presses or the initiation of the thermal film shrinkage necessary for the homogeneous connection in the case of pipe production, the present invention has the advantages that the heating and fusion process of the sealing layers, which are only a few μm thick, of the plastic film webs can be carried out in an extremely short period of time. Because of the decreased sealing time, thermal damage of the plastic materials also is largely avoided. Moreover, relatively high speeds can be achieved in the continuous process of the invention and the film composite can be produced as roll goods which can be further processed with minimal effort.

The sealing layer-free plastic film webs are preferably unstretched plastic films which have a significantly higher propagation tear resistance compared with stretched films. By contrast with the pressing of a compact film stack, in which each film layer has a different temperature profile, pressing according to the invention takes place under constant, gentle conditions for each of the individual plastic film webs. Also, in comparison to pressing a conventional film stack by a double-belt press, lower investment costs, higher processing speeds, a simplification of variation by structuring, sizing and further processing of the surfaces of the film composite, and an increased propagation tear resistance of the film composite of the present invention result.

In FIG. 1, a schematic sectional view of an embodiment of the device according to the invention for producing a multi-layer film composite 21 is illustrated. A temperature-controllable, or heatable roll 1, which generally is a driven steel roll of large diameter, has a high-gloss polished or matt circumferential surface and forms a sealing tool for a number of plastic film webs. These plastic film webs, which typically are wound on supply rolls 18, 19, 20, are, for example, biaxially stretched plastic film webs 14, monoaxially stretched plastic film webs 15 and unstretched plastic film webs 16. Those skilled in the art recognize that any web suitable for making a composite may be wound on supply rolls 18, 19, 20. For example, any combination of films of biaxially stretched thermoplastic, monoaxially stretched thermoplastic and unstretched thermoplastic, coextruded films may be used in accordance with the present invention.

Heated pressure rolls 2, 3, 4, 5, 6 and 7 are disposed along the circumferential surface of roll 1 at equal or varying distances from each other. The pressure rolls contact the circumferential surface of roll 1 under pressure. In all of the embodiments of the device according to the invention shown in the FIGS. 1 through 7, for reasons of illustration only, and not limitation, not more than six plastic film webs of this type are shown. However, up to about twenty or more individual plastic film webs can be sealed together. The number of pressure rolls typically is the same as, or greater than the number of plastic film webs. The number normally is chosen such that the thickness of film composite 21 can be up to about 1 mm.

As illustrated in FIG. 1, an individual, biaxially stretched plastic film web is wound on a supply roll 18, while each individual monoaxially stretched plastic film web 15 is wound on supply roll 19 and each unstretched plastic film web 16 is wound on supply roll 20. Although not shown in FIG. 1, all plastic film webs to be sealed together may be made of the same plastic material, for example, polypropylene, sealed on both sides with the same sealing layer material, treated with the same treatment, i.e. exclusively biaxially or monoaxially stretched, and sealed with unstretched, sealing layer-free plastic films of polypropylene to form film composite 21. Moreover, films made from various plastic materials can be sealed to form a film composite. The only requirement for the film material is the sealability of the individual films provided with sealing layers to the sealing layer-free films.

Individual plastic film webs are fed via guide rolls 17 to the associated pressure roll 2, 3, 4, 5, 6 or 7. These pressure rolls are driven or non-driven, heatable rolls, the diameter of which is much smaller than the diameter of heatable roll 1, which is self-evident with regard to their number of 20 individual rolls. Plastic film webs having sealing layers on both sides, which are fused during the sealing process of the plastic film webs, and sealing layer-free plastic film webs are alternately laminated together. Pressure rolls 2 through 7 typically are made of a material capable of exerting a force on a plastic film web without deformation of the heatable roll 1. For example, pressure rolls 2 through 7 may be made of a hard, smooth material such as metal, polished metal, hardened plastic, and the like. Pressure rolls 2 through 7 may be backing rolls, the metal roll bodies of which are coated with heat-resistant rubber layers and which are heated by heating systems, not shown. Likewise, guide rolls 17, which are upstream of the individual backing rolls, can be preheated so that the plastic film webs, fed to the backing rolls from supply rolls 18, 19, 20, are already heated. The pressure rolls or backing rolls 2 through 7 can be displaced hydraulically, pneumatically or mechanically via a lever system so that they can be raised from the circumferential surface of heatable roll 1 in order to facilitate the introduction of the individual plastic film web into the gap that is delimited by the circumferential surface of heatable roll 1 and the respective pressure rolls 2 through 7. The pressure rolls also may be pure metal rolls, and the like, without rubber coating.

The positioning of the pressure rolls, or backing rolls 2 through 7 in their operating positions, and the application of the pressure, with which the pressure rolls are contacting heatable roll 1 may be by any known method which permits application of a sufficient force against roll 1. Such a pressure thereby exerts a corresponding sealing pressure in order to seal the respective plastic film webs onto the film composite. Typically, the positioning of pressure rolls 2 through 7 and the application of pressure on heatable roll 1 is accomplished either hydraulically, pneumatically or mechanically via a lever mechanism.

Figure 2:
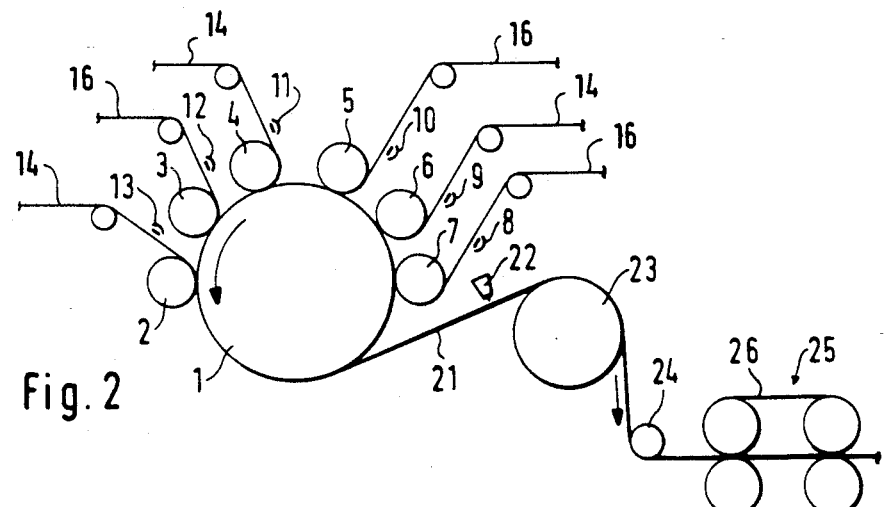
FIG. 2 illustrates a schematic elevation of an embodiment of a device having a cooling arrangement and a double-belt press with a temperature control for the film composite.

A displaceable heating device 8, 9, 10, 11, 12 and 13, for specifically altering the mechanical characteristics of the starting film is disposed close to the contact areas of heatable roll 1 and individual backing rolls 7, 6, 5, 4, 3, and 2, respectively. Displaceable heating devices 8 through 13 alter the mechanical characteristics of the starting film by shrinking and, if necessary, additionally heating the starting film with heated rolls for fusing the sealing layers of the plastic film webs. These heating devices 8 through 13 may be any device capable of exerting a specific amount of heat in a small area. Typically, displaceable heating device 8, 9, 10, 11, 12 or 13 is an infrared heater which can be displaced along a partial zone of the length of the plastic film web. These heating devices also can be air nozzles through which hot air can be passed, which effect the fusion of the sealing layers of the plastic film webs directly before they are brought together in the respective gap. In FIG. 2, heating devices 8 through 13 are shown in positions outside the gaps between heatable roll 1 and the pressure rolls 2 through 7. The distance of the heating devices to the circumferential surface of heatable roll 1 also is adjustable.

The fact that emphasis is placed on the use of coextruded biaxially or monoaxially stretched plastic film webs provided with sealing layers for the lamination or sealing to unstretched plastic film webs to form a film composite does not imply a limitation of the invention to these starting materials. Rather, those skilled in the art readily recognize that a practical alternative to the production of a film composite from coextruded plastic sealing webs results from a sealing of layers of monofilms of identical materials, which monofilms are not stretched and differ only in their degree of orientation and the morphological structure resulting from this.

Compared with unstretched monofilms, mono- or biaxially stretched films have a different morphological structure, which is manifested, inter alia, different melting temperatures of the plastic films. This can be utilized to the extent that in a film composite consisting of alternating laminated unstretched and stretched plastic film webs, the unstretched plastic film webs are already capable of fusion under the normal conventional processing conditions. Therefore, the unstretched plastic film webs function as adhesion promoters with respect to the stretched plastic film webs, which do not melt under the pressure and heating conditions of the sealing process. In other words, with alternating layers of stretched and unstretched plastic film webs in this manner, the webs are not required to have sealing layers to be laminated together. The thickness of the laminated multi-layer film composite 21 typically is within the range of from about 60 to about 1000 μm, but the thickness may also be in the range from 12 to about 60 μm.

An embodiment of the device of the invention shown in FIG. 2 is of similar design to the device illustrated in FIG. 1 with regard to heatable roll 1, pressure rolls or backing rolls 2 through 7 and the guiding of the plastic film webs 14 and 16. For reasons of illustration only, and not limitation, the supply rolls for the plastic film webs have been omitted in this embodiment. With this device, for example, biaxially stretched plastic film webs 14 alternating with unstretched plastic film webs 16 are sealed or laminated to form film composite 21. This embodiment of the device is provided with additional equipment such as a cooling device consisting of a fan or an air nozzle 22, from which cooling air is blown onto the top side of the film composite 21. In accordance with this embodiment, the device may be additionally or optionally provided with a temperature-controllable chill roll 23, over a part of whose circumference film composite 21 is led upon release from heatable roll 1.

A guide roll 24 is provided after chill roll 23, where film composite 21 is deflected from its vertical direction into a horizontal direction in order to subsequently pass through a temperature-controllable double belt press 25. Double belt press 25 typically comprises two endlessly circulating press belts 26 and 27 which form a common pressure zone through which film composite 21 is guided. With the aid of this double belt press 25, both the top and the bottom side of film composite 21 can be structured or also smoothed in a predetermined manner. Double belt press 25 also can be used either alone or in combination with the fan and/or the chill roll for cooling the film composite. Likewise, cooling may be carried out using a cooling bath alone or in conjunction with the aforementioned cooling equipment.

Figure 3:
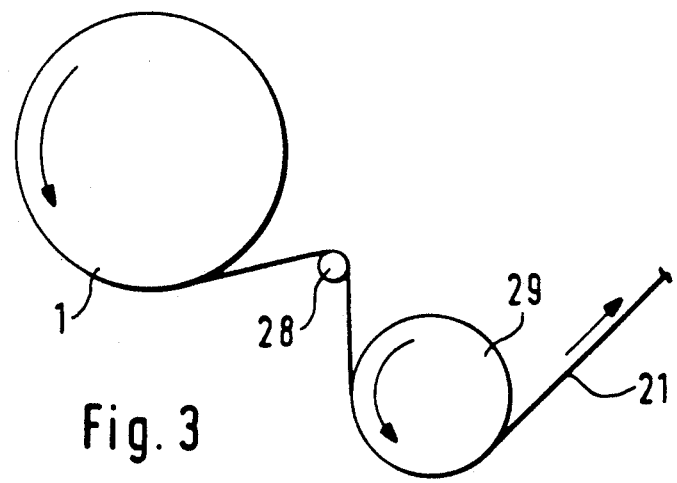
FIG. 3 illustrates a schematic view of an embodiment of a device having a roll arrangement for stretching the film composite.

FIG. 3 illustrates another embodiment of the device, which differs from the device illustrated in FIGS. 1 and 2 in that a roll arrangement comprising a temperature-controllable roll 28 and a driven, also temperature-controllable roll 29 is provided as additional equipment. The diameter of roll 29 typically is a multiple of the diameter of roll 28. For example, the diameter of roll 29 may be 2, 3, 4 or 5 times as large as the diameter of roll 28. In accordance with this embodiment, the curling tendency of film composite 21 is counteracted by stretching the film composite 21 due to exertion of a high tensile force on the film composite. This curling tendency occurs, for example, because the topmost plastic film web has a greater length than the lowermost plastic film web, which forms the base layer of the laminate structure of laminated film composite 21.

Film composite 21 is drawn over roll 28 with the small diameter, causing stretching of the base layer or of the lowermost plastic film web and thus the length difference between the lowermost and topmost plastic film webs is removed, and the curling tendency of film composite 21 is eliminated.

FIGS. 4 to 6a and 6b illustrate various embossing equipment for film composite 21 as additional equipment to heatable roll 1. In the embodiment of the device illustrated in FIG. 4, two embossing foils 31 and 33 are provided which are guided over a part of the circumference of heatable roll 1. The supply rolls for these embossing foils and for the plastic film webs 14 and 16 have been omitted for reasons of clarity. Embossing foil 31 runs from the supply roll, not shown, via a pressure roll 30 to the circumferential surface of heatable roll 1 as a base for film composite 21, which is to be built up in layers. An unstretched plastic film web 16, for example, is fed to heatable roll as the lowermost layer of film composite 21, onto which web biaxially stretched and unstretched plastic film webs 14, 16, 14 are successively laminated. The last laminated biaxially stretched film 14 has either two sealing layers or one sealing layer, which then faces unstretched film 16 and is sealed thereto. Embossing foil 33, as the last and topmost layer, passes over a pressure roll 32 onto multi-layer film composite 21. After film composite 21 and the two embossing foils 31 and 33 are removed from heatable roll 1, the embossing foils are released from the film composite 21 via guide rolls and rolled onto winding rolls, not illustrated.

Figure 4:
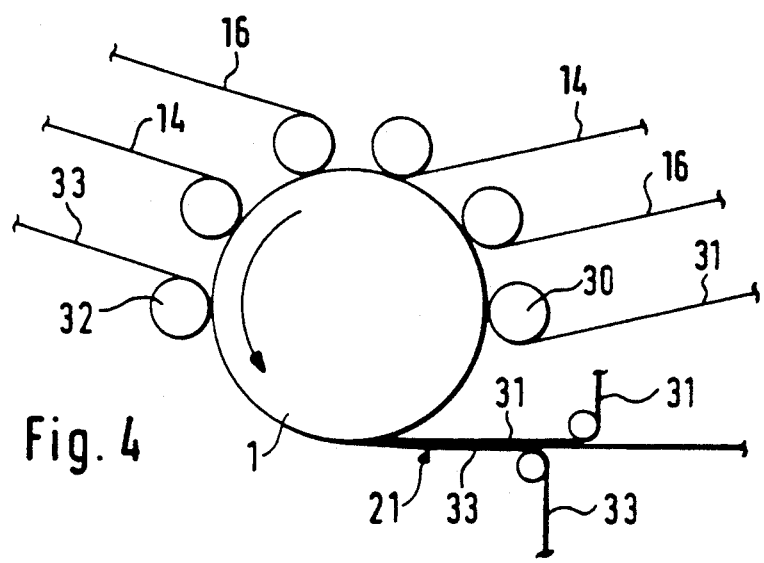
FIG. 4 illustrates a schematic view of an embodiment of a device having embossing foils for structuring the surfaces of the film composite.
Figure 5:
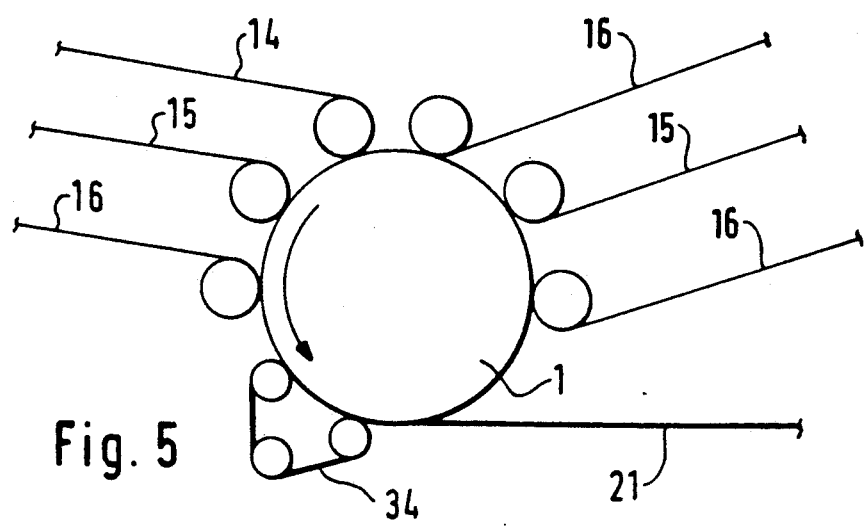
FIG. 5 illustrates an embodiment of a device, having an embossing web for structuring the surfaces of the film composite.

The embodiment of the device of the present invention, as is shown schematically in FIG. 5, has as additional equipment an embossing belt 34, which circulates endlessly over rollers and is in contact with a partial circumference of heatable roll 1. With the aid of, for example, metallic embossing belt 34 it is possible to structure only the bottom side of film composite 21, while the top side remains unstructured. Embossing belt 34 may be made of any material capable of structuring the bottom side of film composite 21. Typically, embossing belt 34 is metallic. Other individual parts of this device for feeding the individual plastic film webs are the same as the embodiments of the device illustrated in FIGS. 1 through 4, and are therefore not described herein. Embossing of the bottom side of composite 21 with the aid of embossing belt 34 takes place before film composite 21 is released from heatable roll 1. Upon release of film composite 21 from heatable roll 1, another cooling treatment in a corresponding cooling arrangement, not shown, also can take place.

Figure 6A:
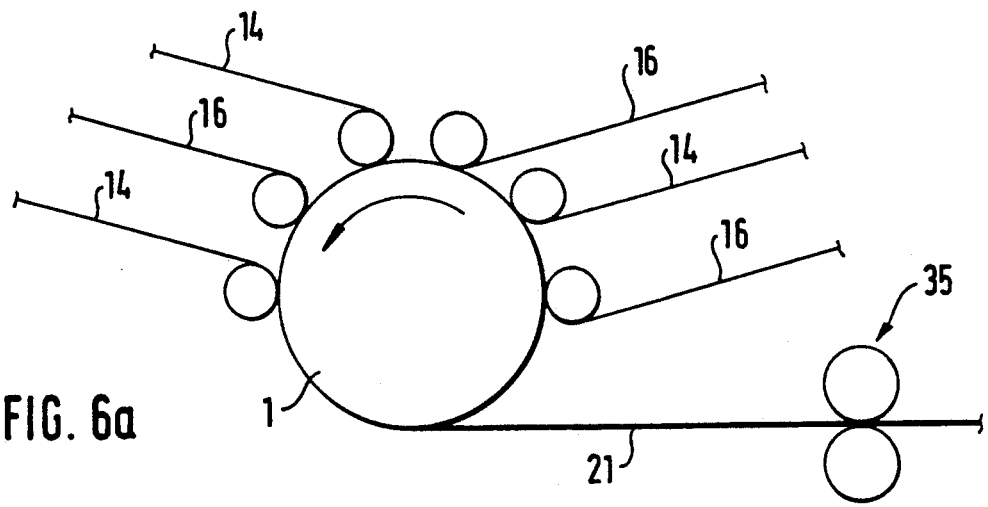
FIG. 6a illustrates an embodiment of a device having an embossing station where the film composite passes between the rolls.

In the embodiment of the device according to the invention illustrated in FIG. 6a, an embossing station 35 which comprises two embossing rollers, is disposed in the direction of travel of film composite 21 after release from heatable roll 1. Embossing station 35 embosses film composite 21 on both sides. After release from roll 1, film composite 21 passes through a gap between the two embossing rolls of embossing station 35 so that the top and bottom side of the film composite 21 undergo suitable structuring.

Figure 6B:
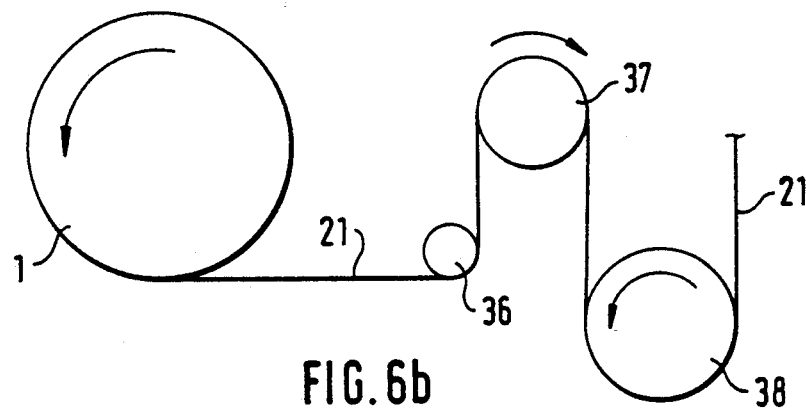

Another method of surface structuring of film composite 21 is illustrated in FIG. 6b. Here, film composite 21, upon release from heatable roll 1, is drawn at high tensile stress over a guide roll 36 and in a meandering manner over temperature-controllable rolls 37 and 38, which are offset with respect to each other in a vertical direction. The surfaces of rolls 37 and 38 are either polished to a high gloss or structured. Because of the high tensile stress which is exerted on film composite 21 by the corresponding drive speed of rolls 37 and 38, a corresponding structuring of both sides of film composite 21 occurs.

Figure 7:
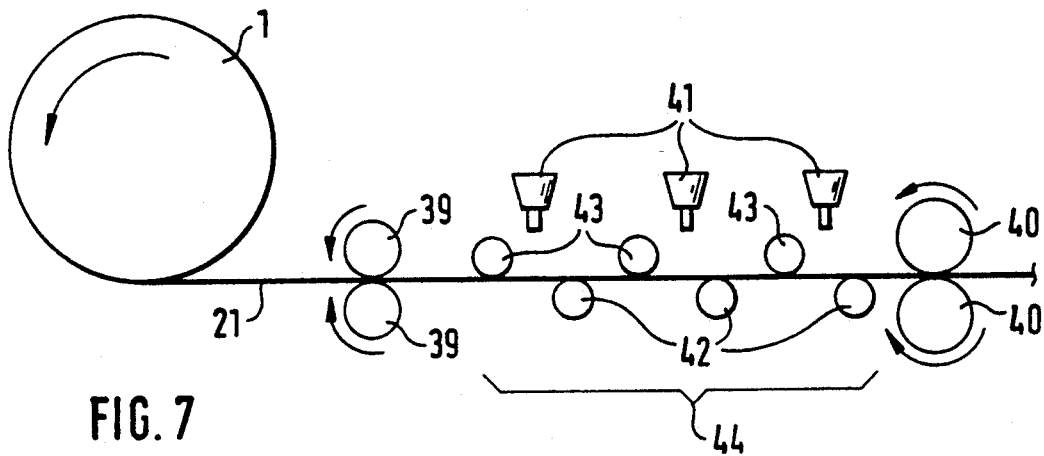
FIG. 7 illustrates an embodiment of a device in which the film composite passes through a cooling arrangement in a planar fashion.

FIG. 7 illustrates a cooling arrangement 44, or cooling zone, which is disposed downstream of heatable roll 1. Cooling arrangement 44 of this type can be present with all of the embodiments illustrated in the preceding FIGS. 1 through 6b. Cooling arrangement 44 consists of a number of fans 41 or air nozzles, through which cooling air passes, and which are disposed above film composite 21, which is transported in a flat position. Cooling arrangement 44 also comprises lower chill rolls 42, over which film composite 21 is transported, and upper chill rolls 43, which are in contact with the top side of film composite 21. Chill rolls 42 and 43 are offset with respect to each other so that they are in contact alternately with the top and bottom side of film composite 21.

Figure 8:
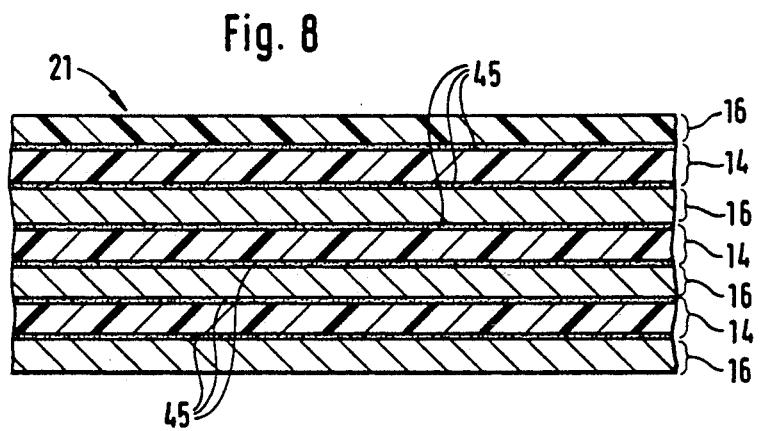
FIG. 8 illustrates a schematic section through a film composite made in accordance with the invention.

FIG. 8 illustrates a schematic section through film composite 21 of, for example, 7 layers of plastic film webs 16, 14, which are laminated together in an alternating fashion. Unstretched plastic films 16 made of, e.g., polypropylene (PP), are without sealing layers, while biaxially stretched films 14, made of, e.g., polypropylene (PP), have a sealing layer 45 on each side. Instead of biaxially stretched plastic films 14, monoaxially stretched plastic film 15 having sealing layers on both sides, may be used. Those skilled in the art readily recognize that combinations of biaxially, monoaxially stretched and unstretched plastic films in any desired sequence are possible.

A typical film composite 21 having 3 layers of plastic films consists of, for example, a 50 μm thick stretched PP film with a sealing layer, an unstretched, sealing layer-free PP monofilm of 25 μm thickness, laminated to this, and a 50 μm thick stretched PP film having a sealing layer facing the monofilm and laminated to the monofilm. The propagation tear resistance of a film composite of this type measured according to DIN 53363 is 23.4 N/mm in the transverse direction and 26.6 N/mm in the longitudinal direction. By comparison with this, the values for a film composite without unstretched PP monofilm are 10.3 N/mm in the transverse direction and 20.7 N/mm in the longitudinal direction. With the film composite according to the present invention, the propagation tear resistance in the transverse direction is therefore a factor of 2.27 greater than the propagation tear resistance in the transverse direction for a conventional composite. This is due primarily to the stretching process, where a stretched PP film has a significantly lower propagation tear resistance than an unstretched film of the same material. Owing to the lamination of the two types of films in accordance with the present invention, the propagation tear resistance is significantly increased by use of the unstretched PP film. The composite strength in N/15 mm, measured by means of the T-peel test according to DIN 53 357, depends on the laminating or sealing temperature, as can be seen from the following table.

TABLE

| Sealing temperature (°C.) | 120 | 130 | 140 | 150 |
|---|---|---|---|---|
| Composite strength (N/15 mm) | 0.5 | 1.2 | 2.1* | 2.2* |

*Above a sealing temperature of 140° C., tearing of the film composite occurs during the test, since the composite strength is then the same as, or greater than, the intrinsic strength of the films of the film composite.

When stretched sealing layer-free films and stretched films with sealing layers are alternately laminated, the base layer of both films may consist of a PP homopolymer with a melting temperature $T_{m1}=165°-170°$ C., and the sealing layer may consist of a PP copolymer with a melting temperature $T_{m2}=120°-140°$ C. The processing temperature T of the film layers therefore typically satisfies the equation:

$$T_{m1} > T \geq T_{m2}$$

Other possibilities of sealing various films together to form a film composite result from the combination of a stretched polyethyleneterephthalate film (oPET) having sealing layers and a stretched, sealing layer-free polyethyleneterephthalate film (polyester), an oPET film with sealing layers and a sealing layer-free, amorphous PET film, or stretched PP film with sealing layers with a sealing layer-free polyethylene film (PE film). In general, sealing layer-free polyolefin films are suitable for a composite having sealing layer-carrying films.

The mode of operation of the individual embodiments of the invention now will be described in greater detail. Individual plastic film webs 14, 15 and 16 are wound on supply rolls 18, 19 and 20, respectively, and are fed via guide rolls 17 to the circumferential surface of roll 1. The unstretched plastic film 16 shown as the lowermost plastic film web, on the right hand side of roll 1 in FIG. 1, is guided around a large partial circumference of roll 1 as the lowermost, or base layer. This plastic film web 16 has no sealing layer. The point of contact for the monoaxially stretched plastic film web 15, which is heated, is located at a certain distance from the point of contact of plastic film web 16 on the roll 1. This plastic film web 15, provided with two sealing layers, is sealed onto plastic film web 16 with the application of pressure by pressure roll 6.

The next point of contact for additional plastic film web 14 on the circumferential surface of roll 1 is located at the same distance from pressure roll 7 as the distance between pressure rolls 7 and 6. This further plastic film web 14 with two sealing layers is heat treated by a heating device 10 and laminated onto the two plastic film webs 16 and 15, which have already been sealed together, by the pressure exerted by pressure roll 5. Another sealing layer-free, unstretched plastic film web 16, a monoaxially stretched plastic film web 15 with two sealing layers and a biaxially stretched plastic film web 14, which has a sealing layer facing the plastic film web 15, or which can be sealing layer-free, are then sealed in sequence in the same manner with the application of pressure and heat onto the three plastic film webs to form the final film composite 21.

In this manner, a film a composite can be built up, for example, from up to about twenty individual polypropylene films. The individual film webs can be made from films including biaxially stretched thermoplastic, monoaxially stretched thermoplastic and unstretched thermoplastic, coextruded films without a sealing layer or with sealing layers provided on one or both sides. Furthermore, the individual films can optionally be pressure pretreated or not pretreated in any way.

The mechanical characteristics of the starting films, and thus also the characteristics of the film composite, can be influenced as desired by the use of the heating devices, preferably in the form of infrared heaters 8 through 13. In the case of oriented plastic films such heating may affect the mechanical characteristics of the film by shrinking. In accordance with the method of the present invention, plastic film webs of the same or different kinds can be sealed together. This applies both to treated and to non-treated starting films. Metal films, alone or as a composite with plastic films, paper sheets or other materials that do not consist of plastics also may be used as starting films. With the application of heat, those skilled in the art recognize that the sealing temperature must be kept below the melting temperature of the individual film webs, and that unstretched film webs have, in general, a lower melting temperature than stretched film webs.

The sealing layers of the plastic film webs typically are fused by heating each plastic film web before contact with the circumferential surface of heated roll 1. The required sealing temperature, depending on the sealing raw material, is ordinarily between about 90° and about 140° C. Since the sealing temperature is always kept below the melting temperature of the individual film web, the orientations produced by stretching the individual film webs are maintained even after sealing.

Upon release from roll 1, film composite 21 is wound on guide rolls, not shown, and then is provided for further processing. In accordance with the device illustrated in FIGS. 2 through 7, film composite 21 is subjected to additional processing stages after release from the circumferential surface of roll 1, such as blowing with cooling air by fan 22 in FIG. 2, and cooling by contact with temperature-controllable chill roll 23 and/or the cooled double-belt press 25. Instead of the fan 22, an air nozzle also can be used, through which the cooling air is blown onto the top side of film composite 21. The flatness of film composite 21 is improved by such cooling.

Through use of the additional equipment illustrated in FIG. 3 with the device according to the invention, film composite 21 can be stretched by temperature-controllable roll 28 and driven temperature-controllable roll 29 in order to counteract any curling tendency of the film composite which may occur.

Further process measures for treating film composite 21 include an embossing of the film composite on one or both sides, in which case different embossing measures may be used. These embossing process stages are carried out using the additional equipment illustrated in FIG. 4 through 7. One-sided embossing of the bottom side of film composite 21 is carried out using the continuously circulating embossing belt 34, which preferably is made of metal, as shown in FIG. 5. Embossing of film composite 21 on both sides is carried out in embossing station 35, which consists of two embossing rolls, through the roll gap of which film composite 21 passes, as shown in FIG. 6a. Embossing of film composite 21 on both sides also is feasible with the aid of the two embossing foils 31 and 33, as shown in FIG. 4. These two embossing foils enclose film composite 21 on both sides along the partial circumference of roll 1, and the bottom and top side of film composite 21 are structured according to the patterns of the embossing foils due to the corresponding pressure application on the multilayer film composite and on the embossing foils.

An additional process measure for structuring film composite 21 with the device according to FIG. 6b consists in guiding the film composite in a meandering manner over driveable and temperature-controllable rolls 37, 38, and exerting a variable tensile stress on film composite 21 by the adjustable rotational speed of these rolls. The exertion of this variable tensile stress produces a structuring of the surfaces of the film composite. Another method of embossing the film on one or both sides consists in forming the rolls 37 and/or 38 as embossing rolls.

If a high degree of flatness of film composite 21 is desired, it is preferable that the film composite travel horizontally with intensive cooling taking place using the device illustrated in FIG. 7. In accordance with this embodiment, temperature-controllable chill rolls and fans or air nozzles, through which cooling air is blown onto the surface of film composite 21, act together in combination to provide a flat composure.

The film composites can be used as starting materials for producing multi-layer thick films or sheets, in which instead of the individual film webs, film composites of this type, as produced according to the above-described process are sealed together in the same manner as the individual film webs.

The present invention has been described in detail with reference to preferred embodiments as a manner of exemplification only, and not of limitation. Those skilled in the art readily recognize that various modifications may be made to the present invention without departing from the spirit and scope thereof.

What is claimed is:

1. A device for producing a multi-layer film composite having at least two layers of film web sealed together comprising:
   (a) a plurality of means for mounting a plurality of film webs, at least one of said plurality of film webs having at least one sealing layer disposed thereon;
   (b) a heatable roll which has a circumferential surface where superposed film webs are sealed together and subsequently released from said heatable roll;
   (c) a plurality of heatable pressure rolls capable of exerting pressure, heat or both pressure and heat which contact said heatable roll along its circumferential surface and form a gap therebetween, wherein each of said plurality of film webs is guided through said gap between each of said plurality of heatable pressure rolls and the heatable roll to seal said film webs together along the sealing layer by application of pressure to form a multi-layer film composite;
   (d) a displaceable heating device disposed near said gap between each of said plurality of heatable pressure rolls and the circumferential surface of said heatable roll for fusing the sealing layers or altering the mechanical characteristics of said film webs; and
   (e) at least one additional device selected from the group consisting of a cooling means for cooling said multi-layer film composite upon release from said heatable rolls, an embossing means for embossing said multi-layer film composite upon release from said heatable roll and a pressing means for pressing said multi-layer film composite upon release from said heatable roll.

2. The device as claimed in claim 1, wherein said plurality of heatable pressure rolls are disposed at equal distances along the circumferential surface of said heatable roll.

3. The device as claimed in claim 1, wherein said plurality of heatable pressure rolls are disposed at varying distances along the circumferential surface of said heatable roll.

4. The device as claimed in claim 1, wherein said plurality of heatable pressure rolls exert only heat so that said film webs are sealed together along the sealing layer by application of heat.

5. The device as claimed in claim 1, wherein said plurality of heatable pressure rolls exert both heat and pressure so that said film webs are sealed together along the sealing layer by application of pressure and heat.

6. A process for producing a multi-layer film composite having at least two layers of film webs, which are alternatively sealable and non-sealable comprising:
   (1) feeding a plurality of film webs which are alternately sealable and non-sealable separately and at a distance from each other to a circumferential surface of a heatable roll, said sealable film webs being provided with a sealing layer on both sides, and said non-sealable film webs having no sealing layer thereon;
   (2) heating each sealable film web in order to fuse the sealing layers of the film webs or affect the mechanical characteristics of the film webs;
   (3) superposing onto a movable first film web said film webs on each other along said circumferential surface;
   (4) sealing said superposed film webs with application of heat and pressure at a point of contact of said first film web and said circumferential surface of said heatable roll to form a multi-layer film composite which is layered to a predetermined final thickness by the continual additive sealing of film webs onto said movable first film web; and
   (5) releasing said multi-layer film composite from said heatable roll.

7. The device as claimed in claim 1, wherein the number of said plurality of said film webs is less than or equal to the number of said plurality of heated pressure rolls.

8. The device as claimed in claim 2, wherein the number of said plurality of said film webs is controlled to maintain a total film thickness of said multi-layer film composite of less than about 1 mm.

9. The device as claimed in claim 1, wherein the heatable pressure rolls exact pressure by pressure means selected from the group consisting of hydraulic, pneumatic and mechanic means, with varying intensity against said heatable roll in order to exert a variable line pressure on said film webs.

10. The device as claimed in claim 1, wherein each of said plurality of heatable pressure rolls comprises a heated backing roll having a metal body and a rubber coating.

11. The device as claimed in claim 1, wherein each of said plurality of heatable pressure rolls is a metal roll without rubber coating and polished to a high gloss.

12. The device as claimed in claim 6, wherein each of said displaceable heating devices is an infrared heater which can be displaced along the film web at an adjustable distance from said heatable roll.

13. The device as claimed in claim 1, wherein a cooling means selected from one or more of the group consisting of a fan, a temperature-controllable chill roll, a temperature-controllable double-belt press, and a cooling bath is provided.

14. The device as claimed in claim 1, said device further comprising a roll arrangement disposed after said heatable roll having driven, temperature-controllable rolls with different diameters which subsequently stretches said multi-layer film composite to eliminate the curling tendency of the multi-layer film composite.

15. The device as claimed in claim 1, wherein an embossing belt circulating continuously over rolls is in contact with the bottom side of said multi-layer film composite over a section of the circumferential surface of said heatable roll in order to emboss the bottom side of the multi-layer film composite before release from said heatable roll.

16. The device as claimed in claim 1, wherein said multi-layer film composite is guided between two embossing foils which are offset with respect to each other in the direction of travel of said multi-layer film composite over the circumferential surface of said heatable roll, wherein said embossing foils provide the bottom and top side of the multi-layer film composite with embossing, and can be rolled up after release from said heatable roll.

17. The device as claimed in claim 1, wherein after release from said heatable roll, said multi-layer film composite passes through a gap between two embossing rolls of an embossing station.

18. The device as claimed in claim 1, wherein said multi-layer film composite is guided, after release from said heatable roll, with high tensile stress in a meandering form over temperature-controllable rolls, which are offset with respect to each other in a vertical direction, and the surfaces of which are polished to a high gloss or are structured.

19. The device as claimed in claim 1, wherein after release from said heatable roll, the multi-layer film composite passes in a flat state through a cooling arrangement, which comprises a plurality of fans and chill rolls, which are offset with respect to each other and alternately contact the top and bottom side of the multi-layer film composite.

20. The device as claimed in claim 1, wherein said plurality of film webs are selected from the group consisting of films of one or more of biaxially stretched thermoplastic, monoaxially stretched thermoplastic and unstretched thermoplastic, coextruded films.

21. The process as claimed in claim 6, wherein said plurality of film webs are selected from the group consisting of films of one or more of biaxially stretched thermoplastic, monoaxially stretched thermoplastic, and unstretched thermoplastic, coextruded films.

22. The process as claimed in claim 21, wherein said film webs of the same or different type are sealed together.

23. The process as claimed in claim 22, wherein said alternately sealable and non-sealable film webs comprise the same polymeric material, and wherein the film webs have a higher melting temperature than said sealing layers.

24. The process as claimed in claim 22, wherein the temperature at which heat is applied to seal the superposed film webs is below the melting temperature, $T_{m1}$, of the film webs.

25. The process as claimed in claim 24, wherein said temperature at which heat is applied to seal the superposed film webs, T, satisfies the following correlation $$T_{m1} > T \geq T_{m2}$$

where $T_{m1}$ represents the melting temperature of the polymeric material of said film web and $T_{m2}$ represents the melting temperature of a sealing layer disposed on said sealable webs.

26. The process as claimed in claim 6, wherein, after release from said circumferential surface of the heatable roll, the multi-layer film composite is cooled by one or more cooling means selected from the group consisting of blowing with cooling air, contact with a cooled double-belt press and contact with chill rolls.

27. The process as claimed in claim 6, said process further comprising guiding said multi-layer film composite, upon release from said heatable roll, over a roll arrangement having driven rolls with different diameters which exert a tensile stress on said film composite, in order to stretch it, and counteract its curling tendency.

28. The process as claimed in claim 6, said process further comprising embossing said multi-layer film composite on one or both sides after release from said circumferential surface of said heatable roll.

29. The process as claimed in claim 6, wherein film webs of non-plastic materials and composites of said film webs of non-plastic materials with plastic films are continuously sealed to said first film web.

30. The process as claimed in claim 6, wherein said multi-layer film composite, upon release from the circumferential surface of said heatable roll, is subjected to one or more treatments selected from the group consisting of cooling, stretching and embossing.

31. A process for producing a multi-layer thick film from multi-layer film composites, in which a plurality of individual multi-layer film composites produced in accordance with claim 6 are sealed together by:
   superposing at least one sealing layer on at least one of said plurality of individual multi-layer film composites;
   superposing said plurality of individual multi-layer film composites; on a circumferential surface of a heatable roll;
   sealing said superposed individual multi-layer film composites with application of heat and pressure to form a multi-layer thick film; and
   releasing said multi-layer thick film from said heatable roll.

* * * * *